Nov. 11, 1958 J. W. BEGLEY ET AL 2,860,174
PNEUMATIC TRANSPORTATION OF SOLID MATERIALS
Filed Feb. 8, 1954 3 Sheets-Sheet 3

FIG.3

INVENTORS
J.W. BEGLEY
R.L. McINTIRE
BY
Hudson and Young

ATTORNEYS

United States Patent Office 2,860,174
Patented Nov. 11, 1958

2,860,174

PNEUMATIC TRANSPORTATION OF SOLID MATERIALS

John W. Begley and Robert L. McIntire, Bartlesville, Okla., assignors to Phillips Petroleum Company, a corporation of Delaware Application February 8, 1954, Serial No. 408,724

19 Claims. (Cl. 260—679)

This invention relates to the pneumatic transportation of solid materials. In one of its more specific aspects, it relates to pebble heater apparatus. In another of its more specific aspects, it relates to the operation of a gas lift for elevating pebbles in a pebble heater apparatus. In still another of its more specific aspects, it relates to a method for controlling the flow of pebbles in the gas lift of a pebble heater apparatus. In yet another of its more specific aspects, it relates to the measurement of the pebble circulation rate in a pebble heater apparatus.

In carrying out thermal conversion processes in pebble heater apparatus, a flowing mass of solid heat exchange material heated to a high temperature by passing hot gas therethrough in a first direct heat exchange step is thereafter caused to contact gaseous reactant materials in a second direct heat exchange. Conventional pebble heater apparatus generally comprises two chambers which may be disposed in substantially vertical alignment. The solid heat exchange material is introduced into the upper portion of the upper chamber where the material forms a moving bed of solid heat exchange material which flows downwardly through the chamber in direct heat exchange with hot gaseous heat exchange material. In the heat exchange, the solid heat exchange material is heated to a high temperature and then passed to a lower chamber in which the hot heat exchange material is caused to contact gaseous reactant materials in a second direct heat exchange relation furnishing heat for the treatment or conversion of the gaseous materials. The solid heat exchange material, cooled as a result of a second heat exchange, emerges from the bottom of the lower chamber and flows downwardly to the lower part of an elevator which elevates the material to the upper end of a chute leading into the upper portion of the upper chamber.

Solid heat exchange material which is conventionally used in pebble heater apparatus is generally called "pebbles." For a more complete description of the pebbles which can be used, reference may be had to U. S. Patent No. 2,536,436.

The pebbles are heated in the upper chamber to temperatures generally in the range of 1200° F. to 3200° F. Ordinarily, pebble inlet temperatures in the lower chamber are about 100° F. to 200° F. below the highest temperatures of the pebbles within the upper chamber. In processes for the production of ethylene from light hydrocarbons, such as ethane or propane, the pebble temperatures in the lower reaction chamber are usually in the range of 1200° F. to 1800° F. In the production of acetylene by pyrolysis of hydrocarbons, temperatures in the range of 1800° F. to 3000° F. are desirable. In the practice of such processes, the cracking reaction involved is endothermic requiring for a particular hydrocarbon feed a specific amount of heat to effect the desired depth of cracking. The heat required for this reaction is delivered by the pebbles in the second heat exchange relation previously referred to. It should be apparent that in any given process the rate of flow of pebbles through the lower chamber as well as the temperature of the pebbles is determinative of the amount of heat available for the cracking reaction and of the amount of hydrocarbon feed which should be introduced into the reaction zone. Furthermore, the temperature to which the pebbles are heated in the upper chamber is related to their residence time therein during which the pebbles undergo a first heat exchange with hot combustion gases. In order to operate a pebble heater apparatus so as to attain the most efficient cracking of the hydrocarbon feed, it becomes important to be able to control the rate of flow of pebbles through the pebble heater system.

In conventional pebble heater apparatus employing a gas lift to elevate the pebbles from the lower to the upper chambers, control of pebble flow through the gas lift is generally obtained by varying the amount of lift gas and the quantity of pebbles supplied to the gas lift. Such conventional apparatus provides no means for maintaining the pebble linear velocity in the gas lift at such a value that the pebbles will rise a predetermined distance in the gas lift. A gas lift generally comprises a lower engaging chamber and an upper settling or disengaging chamber connected by a substantially vertical pebble conduit. Pebbles enter the engaging chamber where they are entrapped in a stream of gas, such as air or steam, and raised through the pebble conduit to the disengaging chamber. In the disengaging chamber, the pebbles fall out of the stream of lift gas and thereafter leave that chamber through a pebble chute and pass into the upper portion of the pebble heating chamber. For efficient and satisfactory operation, it is necessary that the pebbles leave the pebble conduit of the gas lift at such a linear velocity that they fall out of the gas stream before impinging against the top of the disengaging chamber. If the pebbles are allowed to strike the top of the disengaging chamber, the result is a high rate of pebble breakage. Another difficulty encountered in the operation of conventional pebble heater apparatus arises because of plugging of the gas lift as a result of sudden and inadvertent surges of pebbles through the pebble conduit. In accordance with this invention, the velocity of pebbles leaving the pebble conduit is closely controlled so that the distance to which the pebbles are transported into the disengaging chamber is maintained substantially constant. Furthermore, plugging of the gas lift is prevented by continuously regulating the rate of supply of lift gas to the gas lift.

The following objects of the invention will be attained by the various aspects of the invention.

It is an object of the present invention to provide means for controlling the flow of solid materials through pneumatic transportation means.

Another object is to provide a method for controlling the operation of a gas lift in pebble heater apparatus.

Still another object is to provide a method for controlling the linear velocity of pebbles in the gas lift of pebble heater apparatus.

A further object is to provide a control system whereby the flow of pebbles in a gas lift can be maintained at a predetermined rate.

Various other objects, advantages and features of the invention will become apparent from the accompanying disclosure.

Broadly speaking, the present invention comprises controlling the operation of a gas lift by continuously regulating the rate of supply of lift gas to the gas lift in accordance with measured variables proportional to pebble density and pebble linear velocity within the gas lift.

A more complete understanding of the invention may be obtained by reference to the following description and the drawing, in which.

Figure 1:
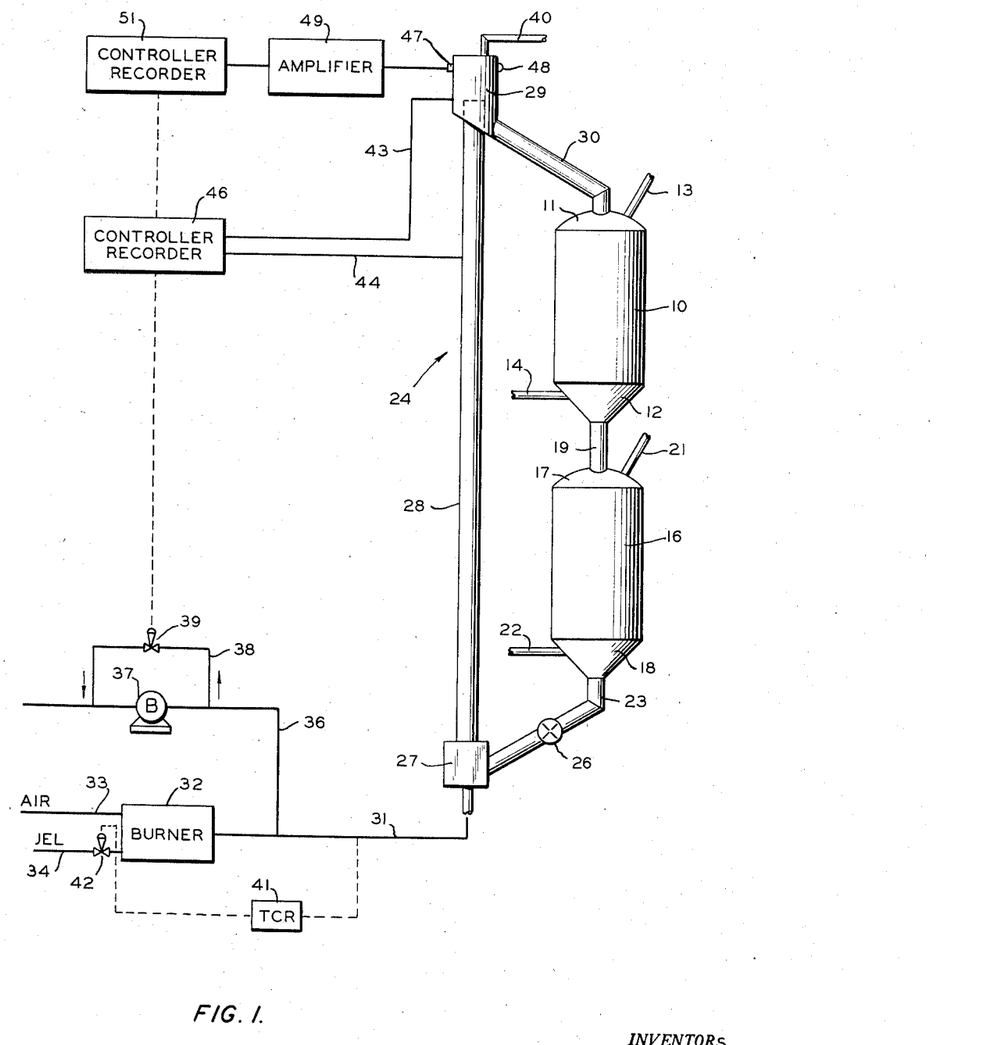
Figure 1 is a diagrammatic elevation of an arrangement of apparatus suitable for practicing the invention.

Referring now to the drawing and in particular to Figure 1, a pebble heater apparatus comprises an upright elongated shell 10 closed at its upper and lower ends by closure members 11 and 12, respectively. Gaseous effluent outlet conduit 13 extends from the upper portion of the pebble heating chamber formed within shell 10 while heating material inlet means 14 is provided in the lower portion of that chamber. Upright elongated shell 16, closed at its upper and lower ends by closure members 17 and 18, respectively, is disposed below shell 10. Pebble conduit means such as conduit 19, or a plurality of such conduits, extending between closure member 12 of shell 10 and closure member 17 of shell 16, connects the pebble heating chamber with the reaction chamber formed within shell 16. Gaseous effluent outlet conduit 21 is disposed in the upper portion of the reaction chamber while gaseous material inlet conduit 22 is provided in the lower portion of that chamber. Pebble outlet conduit 23 which extends downwardly from closure member 18 of the reaction chamber is connected to the lower end portion of elevator 24. Pebble feeder 26 provided intermediate the ends of pebble outlet conduit 23 may be one of the conventional pebble feeders such as a star valve, a gate valve, a rotatable table feeder, or the like.

Elevator 24, which is of the gas lift type, comprises engaging pot 27, gas lift conduit 28, and disengaging chamber 29. Pebble inlet conduit 30 connects disengaging chamber 29 to upper closure member 11 of shell 10. Lift gas inlet conduit 31 is connected between the lower portion of engaging pot 27 and the outlet end of burner 32 which is provided with air and fuel inlet lines 33 and 34, respectively. Lift gas line 36, connected to lift gas inlet conduit 31, is provided with a blower 37. By-pass line 38, containing a flow control means such as motor valve 39, is connected to lift gas line 36 on either side of blower 37. The desired temperature may be maintained in conduit 31 by means of temperature controller-recorder 41 which is operatively connected to valve 42 and conduit 31. Effluent outlet line 40 furnishes means for withdrawing lift gas from disengaging chamber 29.

Lines 43 and 44, which communicate at different vertically spaced points with the upper portion of gas lift conduit 28, are connected to pressure drop controller-recorder 46. Controller-recorder 46, which may be a commercially available type fitted with a pneumatic control unit as manufactured by the Brown Instrument Company, Philadelphia, Pennsylvania, is provided with a pneumatic reset mechanism adapted to reset the control point in accordance with a pneumatic signal. A pneumatic reset mechanism suitable for use with controller-recorder 46 is manufactured by the Foxboro Company, Foxboro, Mass. The distance between the pressure taps, i. e., lines 43 and 44, may vary within wide limits, the only limitation being that steady state conditions prevail in the section of the gas lift conduit across which they are placed. Controller-recorder 46 is operatively connected to motor valve 39 which it actuates pneumatically in accordance with measured changes in pressure drop across the gas lift conduit.

A photoelectric cell 47 is positioned in one side of disengaging chamber 29 directly opposite a source of visible light 48. The output signal from photoelectric cell 47 is amplified by amplifier 49 and thereafter supplied to potentiometer controller-recorder 51. Potentiometer controller-recorder 51, which is fitted with a pneumatic control unit, may be a commercially available instrument of the type manufactured by the Brown Instrument Company, Philadelphia, Pennsylvania. Controller-recorder 51 is operatively connected to the pneumatic reset mechanism of pressure drop controller-recorder 46.

Figure 2:
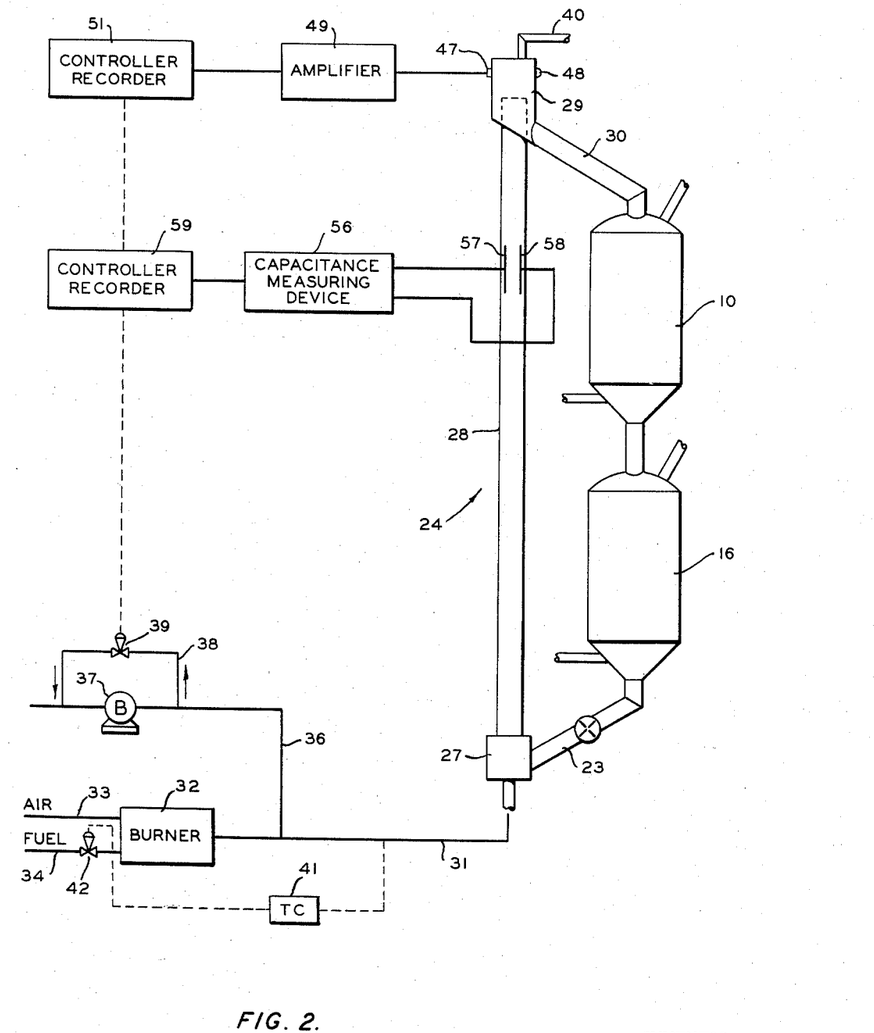
Figures 2 and 3 are diagrammatic elevations of modifications of the apparatus of Figure 1.

Referring to Figure 2 of the drawing, a modification of the apparatus of the invention is illustrated which is very similar to that of Figure 1. A capacitance measuring device 56, comprising a pair of electrically insulated, parallel-spaced plates 57 and 58, disposed in the upper portion of gas lift conduit 28, provides means for measuring the pebble density of the pebbles flowing through the conduit. It is also within the contemplation of the invention to utilize capacitance measuring means other than the one illustrated. Accordingly, a coil wrapped around an insulated section of the lift pipe may be used, the capacitance of the coil being influenced by the number of pebbles therein at any given instant. Still another suitable arrangement comprises a rod positioned in the center of the gas lift conduit as one plate of the condenser while the gas lift conduit itself is used as the grounded plate. For an electrical circuit which can be used advantageously with the capacitance measuring device, the copending U. S. application of J. R. Parsons, Serial No. 376,960, filed August 27, 1953, may be referred to. The capacitance measuring device 56 is operatively connected to potentiometer controller-recorder 59 which is fitted with a pneumatic control unit. Controller-recorder 59 is further provided with a pneumatic reset mechanism similar to that used in conjunction with differential pressure controller-recorder 46 of Figure 1. Potentiometer controller-recorder 51 is operatively connected to the pneumatic reset mechanism of controller-recorder 59 which in turn is operatively connected to motor valve 39. Identical numerals have been utilized to designate elements corresponding to those described above in conjunction with the description of Figure 1.

Figure 3:
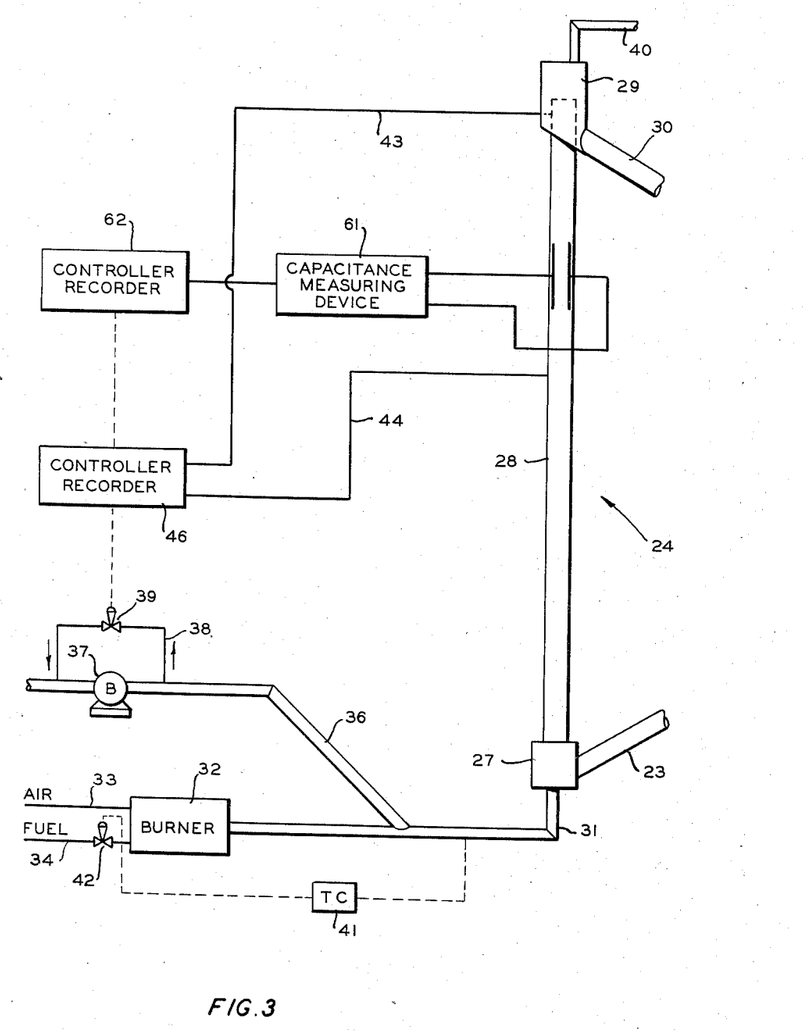

Referring to Figure 3 of the drawing, another modification of apparatus suitable for practicing the invention is illustrated. Pressure drop controller-recorder 46 provided with a pneumatic reset mechanism is connected across the upper portion of gas lift conduit 28 and to motor valve 39 in the same manner as described in relation to Figure 1. A capacitance measuring device 61, similar to the one shown in Figure 2, is operatively connected to potentiometer controller-recorder 62 provided with a pneumatic control unit. Controller-recorder 62 is operatively connected to the pneumatic reset mechanism of pressure drop controller-recorder 46. Elements corresponding to those described in relation to Figure 1 are identified by similar reference numerals.

While the apparatus of Figures 1, 2 and 3 have been described with a certain degree of particularity, it is to be understood that other instruments capable of making the desired measurements come within the scope of the invention. For example, an Ohmart specific gravity meter as manufactured by the Ohmart Corporation, Cincinnati, Ohio, may be substituted for the photoelectric cell assembly or the capacitance measuring device discussed above in conjunction with the figures of the drawing.

In the operation of the pebble heater apparatus of Figure 1, pebbles are heated in the pebble heating chamber formed within shell 10 by contact with hot gaseous heat exchange material which may result from the combustion of fuel outside of the heating chamber or in the lower portion of that chamber in a combustion zone separated from the pebble mass, or by burning a fuel in direct contact with the pebble mass within the chamber. Pebbles are introduced into the pebble heating chamber through pebble inlet conduit 30 and form a contiguous gravitating mass which extends downwardly through shell 10, pebble conduit 19, shell 16, and pebble outlet conduit 23 to pebble feeder 26. The pebbles, heated in the pebble heating chamber to temperatures approximately in the general range of 1200° F. to 3200° F., are thereafter gravitated through conduit 19 into the upper portion of the reaction chamber formed within shell 16. Usually pebble inlet temperatures in the reactor are about 100°

F. to 200° F. below the highest pebble temperatures within the upper chamber. Gaseous reactant materials introduced into the reaction chamber through inlet conduit 22 contact the gravitating mass of hot pebbles and undergo reaction. The product-containing gas is withdrawn through gaseous effluent outlet conduit 21 and then passed to quenching means and a purification system, not shown.

The cooled pebbles flow from the bottom of the reaction chamber through pebble outlet conduit 23 and pass therethrough into engaging pot 27 at a rate dependent upon the operation of the pebble feeder means employed. The rate of flow of pebbles into gas lift conduit 28 may also be controlled by utilizing means disclosed in the copending application of Lloyd E. Dean, Serial No. 309,252, filed September 12, 1952, now abandoned, wherein a movable sleeve surrounds the portion of lift conduit 28 into which the pebbles are introduced, the rate of pebble flow being governed by the position of the sleeve with relation to the openings in the wall of conduit 28. In the engaging pot, the pebbles contact a stream of lift gas, such as air or steam, which is introduced into the lower end of the engaging pot through lift gas inlet conduit 31. Air under a pressure and at a rate of flow sufficient to lift the pebbles from engaging pot 27 to the top of elevator 24 is provided by blower 37. Prior to entry into the elevator through conduit 31, the temperature of the air is raised to the approximate temperature of the pebbles so as to prevent thermal shock thereto by admixing same with combustion gas furnished by burner 32. The desired temperature of the air in conduit 31 is continuously maintained by varying the amount of fuel supplied burner 32 through line 34 in accordance with the setting of temperature controller-recorder 41 operatively connected to valve 42. The pebbles are raised by the stream of lift gas through gas lift conduit 28 to the top of the elevator where the pebbles fall out of the stream in disengaging chamber 29 and pass down pebble inlet conduit 30 into the upper portion of the pebble heating chamber. The amount of lift gas supplied to the elevator is controlled by the operation of motor valve 39 positioned in by-pass line 38 as will be described more in detail hereinafter. The lift gas is withdrawn from the disengaging chamber through gaseous effluent conduit 40.

It has been found that the pressure drop existing across a section of gas lift conduit 28 is a measure of the pebble density therein and varies directly with the rate of pebble flow therethrough. In order for a pressure drop measurement to actually indicate a specific pebble flow rate, however, it is necessary that steady state condition, i. e., a constant pebble density and a constant pebble linear velocity, exist in that portion of the gas lift conduit across which the pressure drop is measured. In addition to maintaining a constant pebble linear velocity, it is necessary to control this velocity so that the pebbles are thrown into the disengaging chamber a definite and constant distance above the upper end of the lift conduit. Since the pebble density, and concomitantly the pressure drop, as well as the pebble linear velocity vary with the amount of lift gas supplied to the elevator, by controlling the rate of flow of lift gas it is possible to maintain a desired pressure drop or pebble density and a desired rate of pebble flow at a definite and constant pebble linear velocity.

The cooled pebbles flowing from the bottom of the reaction chamber through pebble outlet conduit 23 are passed therethrough into engaging pot 27 at a constant rate as determined by the operation of pebble feeder means 26. Pressure drop controller-recorder 46 initially is set at the pressure drop which it is desired to maintain across thhe upper portion of gas lift conduit 28. Controller-recorder 46 continuously measures and records the pressure drop existing across the section to which lines 43 and 44 are connected. Since controller-recorder 46 is also operatively connected to motor valve 39, this valve is actuated so that lift gas is supplied to elevator 24 through conduit 31 at a rate sufficient to maintain the set pressure drop across the gas lift conduit. The pebbles are entrapped in the lift gas and carried to the top of the elevator where they fall out of the stream of lift gas into disengaging chamber 29. The distance which the pebbles rise in the disengaging chamber before falling back is dependent upon the linear velocity of the pebbles as they leave the gas lift conduit. For satisfactory operation of the gas lift elevator, as discussed above, it is important that the pebbles leave the gas lift conduit at a constant linear velocity of such a value that the pebbles will rise a definite and constant distance in the disengaging chamber. For example, with a gas lift elevator having an 8 foot high disengaging chamber, it is desirable that the linear velocity of the pebbles be such that they rise only 5 or 6 feet in the chamber before falling out of the lift gas stream. Since pebble linear velocity varies directly with the amount of lift gas supplied to the elevator, by controlling the rate of flow of lift gas the desired pebble linear velocity may be maintained.

A photoelectric cell assembly comprising a source of visible light 48 and photoelectric cell 47 provides means for controlling the linear velocity of the pebbles and concomitantly the height to which the pebbles rise in the disengaging chamber. The intensity of the light beam from source 48 impinging upon photoelectric cell 47 is dependent upon the number of pebbles passing through the beam. For example, if pebbles do not rise high enough in the disengaging chamber so as to enter the beam of light, the intensity of the light is at a maximum. On the other hand, if all the pebbles leaving the gas lift conduit pass through the beam, the intensity of the light is at a minimum. It should be apparent, therefore, that the signal produced by photoelectric cell 47 is proportional to the number of pebbles seen by the cell. With the gas lift elevator operating properly, the photoelectric cell sees a definite number of pebbles, indicating that the pebbles are rising a definite and constant distance into the disengaging chamber. Accordingly, the photoelectric cell may be set for a percentage light transmission corresponding to the aforementioned definite number of pebbles which setting corresponds to a definite signal output. The electrical signal generated by the photoelectric cell is amplified by amplifier 49 and thereafter supplied to potentiometer controller-recording 51. The pneumatic signal output of controller-recorder 51, which is proportional to the electrical signal generated by photoelectric cell 47, is supplied to the pneumatic reset mechanism of pressure drop controller-recorder 46. Thus, if pebbles rise too high into the disengaging chamber, the photoelectric cell sees too many pebbles, and the percentage light transmission is reduced from the predetermined set value. The resulting change in the signal from the photoelectric cell is amplified and fed to controller-recorder 51 which converts the electrical signal to a pneumatic signal. The pneumatic signal is thereafter supplied to the reset mechanism of controller-recorder 46 which resets the pressure drop setting of controller-recorder 46 to a lower value. In response to the resetting of the control point of controller-recorder 46, a pneumatic signal is produced which actuates motor valve 39, opening this valve so that more lift gas is by-passed through line 38. A decreasing supply of lift gas is thereby supplied to the gas lift elevator until the pressure drop across the gas lift conduit corresponds to the new setting of the control point of controller-recorder 46. Because of the decreased supply of lift gas to the gas lift elevator, it should be apparent that the pebbles now do not rise as high in the disengaging chamber. The above described operation continues until photoelectric cell 47 sees an amount of pebbles corresponding to its predetermined light transmission setting at which point the pebbles are rising the desired distance in the disengaging chamber. If it should happen that the pebbles are not rising high enough into the disengaging chamber, the reverse of the operation as described above takes place. In such a situation, the overrider comprising the photoelectric cell assembly and controller 51 acts to reset the control point of pressure controller 46 at a higher value. In response to such a resetting of the control point, pressure drop controller-recorder 46 provides a pneumatic signal which actuates motor valve 39, thereby moving that valve toward its closed position. Thus, an additional amount of lift gas is supplied to the gas lift conduit, thereby raising the pebbles a greater distance in the disengaging chamber. This operation continues until photoelectric cell 47 sees an amount of pebbles corresponding to its percentage light transmission setting.

The operation of the modification of the apparatus of the invention as illustrated in Figure 2 is essentially the same as that of the apparatus of Figure 1. Instead of measuring the pressure drop across a section of the gas lift conduit, however, a capacitance measuring device is utilized to determine the pebble density within the gas lift conduit. Since the pressure drop existing across a section of the gas lift conduit is directly proportional to pebble density, the capacitance measuring device, in conjunction with potentiometer controller-recorder 59, and the pressure drop controller-recorder of Figure 1 in effect perform essentially the same functions. The signal output of the capacitance measuring device, which is proportional to pebble density, is fed into controller-recorder 59. The pneumatic signal output of controller-recorder 59 is proportional to the signal output from the capacitance measuring device. Initially, controller-recorder 59 is set at the pebble density which it is desired to maintain in the gas lift conduit. Since controller-recorder 59 is operatively connected to motor valve 39, this valve is actuated so that lift gas is supplied to the gas lift elevator through conduit 31 at a rate sufficient to maintain a pebble density corresponding to the setting of controller-recorder 59. The photoelectric cell assembly together with its controller 51 operates in the same manner as described in relation to Figure 1, acting as an overrider to reset controller-recorder 59. Accordingly controller 59 provides a pneumatic signal which actuates motor valve 39 so as to maintain a constant and definite pebble linear velocity in the gas lift conduit.

In the operation of the apparatus of Figure 3, flow of lift gas to the gas lift elevator is controlled as in the apparatus of Figure 1 by utilizing a pressure drop controller-recorder operatively connected to the upper section of gas lift conduit 28 and motor valve 39. Instead of using an overrider comprising a photoelectric cell assembly as in Figure 1, however, this modification utilizes a capacitance measuring device 61 to reset the control point of the controller-recorder. It has been found that as the pebble density in the gas lift conduit increases, the height to which the pebbles rise in the disengaging chamber decreases proportionally. For any given pressure drop, therefore, there is a certain pebble density corresponding to the distance which it is desired that pebbles rise in the disengaging chamber. Since the pebble density may be increased or decreased by varying the rate of flow of lift gas to the gas lift elevator, the desired pebble density corresponding to the measured pressure drop may be maintained by controlling the rate of flow of lift gas. Initially controller-recorder 46 is set at the pressure drop which it is desired to maintain across the upper section of the gas lift conduit. Controller-recorder 62 is given a pebble density setting corresponding to the pressure drop setting of controller-recorder 46. The signal output of capacitance measuring device 61, which is proportional to pebble density is fed into controller-recorder 62. The pneumatic signal output of controller-recorder 62, which is proportional to the signal output of the capacitance measuring device, is applied to the pneumatic reset mechanism of controller-recorder 46. The pneumatic reset mechanism operates to reset the control point of controller-recorder 46. Since controller-recorder 46 is operatively connected to motor valve 39, this valve is actuated so that lift gas is supplied to the gas lift elevator through conduit 31 at a rate sufficient to maintain the pressure drop across the gas lift conduit at a value corresponding to the new setting of the control point. In this manner, the pressure drop across the upper section of the gas lift conduit is continuously maintained at a value corresponding to the pebble density in the gas lift conduit.

By operating in the manner as described above so as to continuously regulate the rate of supply of lift gas to the gas lift, plugging of the gas lift by sudden and inadvertent surges of pebbles is prevented. It has been found that when the pebble density in the gas lift conduit exceeds a predetermined value, plugging of the gas lift conduit with pebbles results. In accordance with the present invention, the pebble density is maintained substantially constant, and any deviations therein are automatically compensated for by varying the rate of supply of lift gas. Accordingly, continuous operation of the gas lift is assured without any of the stoppages often encountered in conventional pebble heater operation.

It is also within the contemplation of the invention to control the operation of the gas lift by the measurement of combinations of variables other than those specifically disclosed and discussed hereinbefore. Accordingly, the temperature of the lift gas in conjunction with pebble density or pressure drop measurements may be utilized to regulate the rate of supply of lift gas to the gas lift elevator. These latter combinations of variables may be employed to effect the desired control since pebble linear velocity is a function of the temperature of the lift gas. Since it is desired, however, to supply lift gas to the gas lift at substantially the temperature of the pebbles in order to avoid thermal shock thereto, it is preferred to operate the gas lift as described in relation to Figures 1, 2 and 3 instead of utilizing the temperature measurements of the lift gas as one of the control variables.

In accordance with another aspect of the present invention, the pebble circulation rate in pebble heater apparatus may be determined and controlled by utilizing the apparatus of Figures 1, 2, and 3. As previously mentioned, the rate of pebble flow through the gas lift conduit varies directly with the pressure drop across a section of that conduit wherein steady state conditions prevail. Referring specifically to Figure 1, with pebble feeder 26 supplying pebbles to engaging pot 27 at a constant rate, steady state conditions exist in the upper portion of gas lift conduit 28 when the graph of controller-recorder 46 indicates substantially the same pressure drop over a substantial period of time. This is the case because a constant pressure drop recording is an indication that pebbles are leaving the gas lift conduit at a constant linear velocity and that the pebble density within that conduit is constant. By directly measuring the number of pounds of pebbles flowing through gas lift conduit 28 and pebble inlet conduit 30 in a unit of time, a pebble circulation rate in thousands of pounds per hour is arrived at corresponding to the specific pressure drop reading. Apparatus which may be advantageously used for measuring the number of pounds of pebbles flowing through the pebble heater system in a unit of time is disclosed by D. S. Hall in copending application Serial No. 400,462, filed December 28, 1953, now U. S. Patent No. 2,797,335. If the rate at which pebble feeder 26 supplies pebbles to the engaging pot is now changed, it should be apparent that the control point of controller-recorder 46 will be reset through the operation of potentiometer controller 51 with the result that motor valve 39 is actuated so as to vary the amount of lift gas supplied the gas lift elevator. When the pressure drop reading of controller-recorder 46 again becomes substantially constant, thereby indicating the existence of steady state conditions at the new pebble feeder rate, the number of pounds of pebbles flowing through gas lift conduit 28 and pebble outlet conduit 30 in a unit of time is again measured. A pebble circulation rate is thereby obtained corresponding to the pressure drop reading at the new pebble feeder rate. By repeating the above-described operation at different pebble feeder rates, additional pebble circulation rates may be arrived at which correspond to specific pressure drop readings. It should be apparent that calibration curves may be prepared from this information so that the pebble circulation rate of the pebble heater system may be easily and readily determined by merely noting the pressure drop as recorded by controller-recorder 46. Furthermore, the pebble circulation rate in the system may be controlled by simply varying the operation of pebble feeder 26 so as to obtain a measured pressure drop corresponding to the desired pebble circulation rate.

The apparatus of Figures 2 and 3 may be similarly utilized to determine and control the rate at which pebbles flow through the pebble heater system. Referring to Figure 2, potentiometer controller-recorder 59 will give relative readings of the capacitance of the condenser circuit which readings are an indication of the pebble density in the gas lift conduit. Since the pebble density varies directly with the pressure drop, the pebble density indications may be used in the same manner as the pressure drop readings as described above and calibration curves prepared in terms of pebble circulation rate and pebble density. With reference to Figure 3, the calibration curves are prepared essentially as explained with relation to Figure 1, i. e., in terms of pebble circulation rate and pressure drop. It is to be understood that during the above-described operations the temperature of the lift gas is maintained substantially constant and that a different calibration curve is required for each substantial variation in the temperature of the lift gas.

It will be apparent that by operating the gas lift elevator of the pebble heater apparatus in the manner as described above, we have provided a method of operation which overcomes many of the disadvantages of conventional pebble heater gas lifts. Accordingly, constant control over the operation of the gas lift is made possible while at the same time minimizing pebble breakage and reducing the possibility of pebbles plugging the gas lift. It is not intended, however, to limit the present invention to pebble heater apparatus. Rather, the invention may be used in conjunction with any installation wherein it is desired to transport solid materials, e. g., TCC units, fluid catalytic crackers, grain elevators, etc.

As will be evident to those skilled in the art, various modifications of this invention can be made or followed in the light of the foregoing disclosure and discussion without departing from the spirit or scope of the disclosure.

We claim:

1. A method of operating a gas lift elevator which comprises supplying particulate solid material to the lower portion of a gas lift conduit, passing a stream of lift gas into the lower portion of said conduit; entrapping solid material in said stream of lift gas, thereby raising said solid material to the upper end of said conduit; continuously measuring a first variable proportional to the amount of solid material flowing in said conduit per unit time; supplying lift gas to the lower portion of said conduit at a rate sufficient to maintain said first variable at a fixed value; measuring a second variable proportional to the linear velocity of said solid material in the upper end of said conduit; changing the fixed value of said first variable in accordance with said measured second variable; regulating the supply of said lift gas to the lower portion of said conduit so as to maintain said first variable at its changed value and said second variable at a fixed value; and separating said solid material from said stream of lift gas.

2. A method of operating a gas lift elevator comprising a lower pebble engaging chamber and an upper pebble disengaging chamber, said chambers being connected by a substantially upright gas lift conduit, which comprises supplying pebbles to said engaging chamber; passing a stream of lift gas into the lower portion of said engaging chamber; entrapping pebbles in said stream of lift gas, thereby raising said pebbles to said disengaging chamber; continuously measuring a first variable proportional to the number of pebbles flowing in said gas lift conduit per unit time; supplying lift gas to said engaging chamber at a rate sufficient to maintain said first variable at a fixed value; measuring a second variable proportional to the linear velocity of said pebbles leaving the upper end of said gas lift conduit; changing the fixed value of said first variable in accordance with said measured second variable; regulating the supply of said lift gas to said engaging chamber so as to maintain said first variable at its changed value and said second variable at a fixed value; and removing pebbles from said disengaging chamber.

3. A method of operating a gas lift elevator comprising a lower pebble engaging chamber and an upper pebble disengaging chamber, said chambers being connected by a substantially upright gas lift conduit, which comprises introducing pebbles into said engaging chamber; passing a stream of lift gas into the lower portion of said engaging chamber; entrapping said pebbles in said stream of lift gas, thereby raising said pebbles to said disengaging chamber; continuously measuring the pressure drop existing across an upper section of said gas lift conduit; supplying lift gas to said engaging chamber at a rate sufficient to maintain a predetermined pressure drop across said upper section of said gas lift conduit; measuring a variable proportional to the distance to which pebbles rise in said disengaging chamber; changing the value of said predetermined pressure drop in accordance with said measured variable proportional to the distance to which pebbles rise in said disengaging chamber; regulating the supply of said lift gas to said engaging chamber so as to maintain the pressure drop at its changed value and said variable at a fixed value; and removing pebbles from said disengaging chamber.

4. A method of operating a gas lift elevator comprising a lower pebble engaging chamber and an upper pebble disengaging chamber, said chambers being connected by a substantially upright gas lift conduit, which comprises introducing pebbles into said engaging chamber; passing a stream of lift gas into the lower portion of said engaging chamber; entrapping said pebbles in said stream of lift gas, thereby raising said pebbles to said disengaging chamber; continuously measuring the pressure drop existing across an upper section of said gas lift conduit; supplying lift gas to said engaging chamber at a rate sufficient to maintain a predetermined pressure drop across said upper section of said gas lift gas conduit; measuring the pebble density in an upper section of said gas lift conduit; changing the value of said predetermined pressure drop in accordance with said measured pebble density; regulating the supply of said lift gas to said engaging chamber so as to maintain said pressure drop at its changed value and said pebble density at a fixed value; and removing pebbles from said disengaging chamber.

5. A method of operating a gas lift elevator comprising a lower pebble engaging chamber and an upper pebble disengaging chamber, said chambers being connected by a substantially upright gas lift conduit, which comprises introducing pebbles into said engaging chamber; passing a stream of lift gas into the lower portion of said engaging chamber; entrapping said pebbles in said stream of lift gas, thereby raising said pebbles to said disengaging chamber; continuously measuring the pebble density in an upper portion of said lift gas conduit; supplying lift gas to said engaging chamber at a rate sufficient to maintain a fixed pebble density measurement; measuring a variable proportional to the distance to which pebbles rise in said disengaging chamber; changing the value of said fixed pebble density measurement in accordance with said measured variable proportional to the distance pebbles rise in said disengaging chamber; regulating the supply of said lift gas to said engaging chamber so as to maintain said pebble density measurement at its changed value and said variable at a fixed value; and removing pebbles from said disengaging chamber.

6. A method for measuring the circulation rate of pebbles in pebble heater apparatus comprising an upper chamber, a lower chamber and a gas lift connecting the lower portion of said lower chamber to the upper portion of said upper chamber which comprises gravitating pebbles through said upper and lower chambers into the lower portion of said gas lift; introducing a stream of lift gas into the lower end of said gas lift at a substantially constant temperature so as to elevate said pebbles to the top of said gas lift; continuously measuring a first variable proportional to the number of pebbles flowing in said gas lift per unit time; supplying lift gas to said gas lift at a rate sufficient to maintain said first variable at a fixed value; measuring a second variable proportional to the linear velocity of pebbles in the upper end of said gas lift; changing the fixed value of said first variable in accordance with said measured second variable; regulating the supply of said lift gas to said gas lift so as to maintain said first variable at its changed value and said second variable at a fixed value; comparing the changed value of said first variable with known pebble circulation rates corresponding to known values of said first variable; removing pebbles from the upper end of said gas lift; and passing said pebbles into the upper portion of said upper chamber.

7. A method for measuring the circulation rate of pebbles in pebble heater apparatus comprising an upper chamber, a lower chamber and a gas lift connecting the lower portion of said lower chamber to the upper portion of said upper chamber which comprises gravitating pebbles through said upper and lower chambers into the lower portion of said gas lift; introducing a lift gas into the lower end of said gas lift at a substantially constant temperature so as to elevate said pebbles to the top of said gas lift; continuously measuring the pressure drop existing across an upper section of said gas lift; supplying lift gas to the lower end of said gas lift at a rate sufficient to maintain a predetermined pressure drop across said upper section and said gas lift; measuring the linear velocity of pebbles in the upper end of said gas lift; changing the value of said predetermined pressure drop in accordance with the measured linear velocity of pebbles in said gas lift; regulating the supply of said lift gas to said gas lift so as to maintain the pressure drop at its changed value and said linear velocity of pebbles at a fixed value; comparing the changed value of pressure drop with known pebble circulation rates corresponding to known values of pressure drop; removing pebbles from the upper end of said gas lift; and passing said pebbles into the upper portion of said upper chamber.

8. A method for measuring the circulation rate of pebbles in pebble heater apparatus comprising an upper chamber, a lower chamber and a gas lift connecting the lower portion of said lower chamber to the upper portion of said upper chamber which comprises gravitating pebbles through said upper and lower chambers into the lower portion of said gas lift; introducing a stream of lift gas into the lower end of said gas lift at a substantially constant temperature so as to elevate said pebbles to the top of said gas lift; continuously measuring the pressure drop existing across an upper section of said gas lift; supplying lift gas to the lower end of said gas lift at a rate sufficient to maintain a predetermined pressure drop across said upper section of said gas lift; measuring the pebble density in an upper section of said gas lift; changing the value of said predetermined pressure drop in accordance with said measured pebble density; regulating the supply of lift gas to the lower end of said gas lift so as to maintain said pressure drop at its changed value and said pebble density at a fixed value; comparing the changed value of pressure drop with known pebble circulation rates corresponding to known values of pressure drop; removing pebbles from the upper end of said gas lift; and passing said pebbles into the upper portion of said upper chamber.

9. A method for measuring the circulation rate of pebbles in pebble heater apparatus comprising an upper chamber, a lower chamber and a gas lift connecting the lower portion of said lower chamber to the upper portion of said upper chamber which comprises gravitating pebbles through said upper and lower chambers into the lower portion of said gas lift; introducing a stream of lift gas into the lower end of said gas lift at a substantially constant temperature so as to elevate said pebbles to the top of said gas lift; continuously measuring the pebble density in an upper portion of said gas lift; supplying lift gas to the lower end of said gas lift at a rate sufficient to maintain a fixed pebble density measurement; measuring the linear velocity of pebbles in the upper portion of said gas lift; changing the value of said fixed pebble density measurement in accordance with the measured linear velocity of pebbles in said gas lift; regulating the supply of lift gas to the lower end of said gas lift so as to maintain said pebble density measurement at its changed value and said linear velocity of pebbles at a fixed value; comparing the changed value of said pebble density measurement with known pebble circulation rates corresponding to known values of pebble density; removing pebbles from the upper end of said gas lift; and passing said pebbles into the upper portion of said upper chamber.

10. An improved method of operating pebble heater apparatus which comprises heating a uniform contiguous mass of pebbles in a pebble heating chamber to a temperature in the range of about 1200° F. to 3200° F.; gravitating the heated pebbles from the lower portion of said pebble heating chamber into the upper portion of a reaction chamber; contacting said heated pebbles with reactant materials; removing gaseous effluent from the upper portion of said reaction chamber; gravitating cooled pebbles from the lower portion of said reaction chamber into the lower portion of a gas lift at a constant rate; introducing a lift gas into the lower end of said gas lift at a substantially constant temperature so as to elevate said pebbles to the top of said gas lift; continuously measuring a first variable proportional to the number of pebbles flowing in said gas lift per unit time; supplying lift gas to said gas lift at a rate sufficient to maintain said first variable at a fixed value; measuring a second variable proportional to the linear velocity of pebbles in the upper end of said gas lift; changing the fixed value of said first variable in accordance with said measured second variable; regulating the supply of said lift gas to said gas lift so as to maintain said first variable at its changed value and said second variable at a fixed value; removing pebbles from the upper end of said gas lift; and passing said pebbles into the upper portion of said heating chamber.

11. An improved method of operating pebble heater apparatus which comprises heating a uniform contiguous mass of pebbles in a pebble heating chamber to a temperature in the range of about 1200° F. to 3200° F.; gravitating the heated pebbles from the lower portion of said pebble heating chamber into the upper portion of a reaction chamber; contacting said heated pebbles with reactant materials; removing gaseous effluent from the upper portion of said reaction chamber; gravitating cooled pebbles from the lower portion of said reaction chamber into the lower portion of a gas lift at a constant rate; introducing a lift gas into the lower end of said gas lift at a substantially constant temperature so as to elevate said pebbles to the top of said gas lift; continuously measuring the pressure drop existing across an upper section of said gas lift; supplying lift gas to the lower end of said gas lift at a rate sufficient to maintain a predetermined pressure drop across said upper section of said gas lift; measuring the linear velocity of pebbles in an upper portion of said gas lift; changing the value of said predetermined pressure drop in accordance with the measured linear velocity of pebbles in the upper portion of said gas lift; regulating the supply of lift gas to the lower end of said gas lift so as to maintain the pressure drop at a changed value and said linear velocity of pebbles at a fixed value; removing pebbles from the upper end of said gas lift; and passing said pebbles into the upper portion of said heating chamber.

12. An improved method of operating pebble heater apparatus which comprises heating a uniform contiguous mass of pebbles in a pebble heating chamber to a temperature in the range of about 1200° F. to 3200° F.; gravitating the heated pebbles from the lower portion of said pebble heating chamber into the upper portion of a reaction chamber; contacting said heated pebbles with reactant materials; removing gaseous effluent from the upper portion of said reaction chamber; gravitating cooled pebbles from the lower portion of said reaction chamber into the lower portion of a gas lift at a constant rate; introducing a lift gas into the lower end of said gas lift at a substantially constant temperature so as to elevate said pebbles to the top of said gas lift; continuously measuring the pressure drop existing across an upper section of said gas lift; supplying lift gas to the lower end of said gas lift at a rate sufficient to maintain a predetermined pressure drop across said upper section of said gas lift; measuring the pebble density in an upper portion of said gas lift; changing the value of said predetermined pressure drop in accordance with said measured pebble density; regulating the supply of said lift gas to the lower end of said gas lift so as to maintain said pressure drop at its changed value and said pebble density at a fixed value; removing pebbles from the upper end of said gas lift; and passing said pebbles into the upper portion of said heating chamber.

13. An improved method of operating pebble heater apparatus which comprises heating a uniform contiguous mass of pebbles in a pebble heating chamber to a temperature in the range of about 1200° F. to 3200° F.; gravitating the heated pebbles from the lower portion of said pebble heating chamber into the upper portion of a reaction chamber; contacting said heated pebbles with reactant materials; removing gaseous effluent from the upper portion of said reaction chamber; gravitating cooled pebbles from the lower portion of said reaction chamber into the lower portion of a gas lift at a constant rate; introducing a lift gas into the lower end of said gas lift at a substantially constant temperature so as to elevate said pebbles to the top of said gas lift; continuously measuring the pebble density in an upper portion of said gas lift; supplying lift gas to the lower end of said gas lift at a rate sufficient to maintain a fixed pebble density measurement; measuring the linear velocity of pebbles in an upper portion of said gas lift; changing the value of said fixed pebble density measurement in accordance with the measured linear velocity of pebbles in said upper portion of said gas lift; regulating the supply of lift gas to the lower end of said gas lift so as to maintain said pebble density measurement at its changed value and said linear velocity of pebbles at a fixed value; removing pebbles from the upper end of said gas lift; and passing said pebbles into the upper portion of said heating chamber.

14. A pneumatic elevating means which comprises a substantially upright gas lift conduit; solid material engaging means in the lower end of said gas lift; solid material inlet means connected to said engaging means; lift gas intlet means connected to said engaging means; solid material disengaging means in the upper end of said gas lift conduit; solid material outlet means connected to said disengaging means; gaseous effluent outlet means in the upper portion of said disengaging means; means for measuring a first variable proportional to the amount of solid material flowing in said gas lift conduit per unit time; means for measuring a second variable proportional to the linear velocity of solid material leaving the upper end of said gas lift conduit; a first controller provided with a reset means, said controller being operatively connected to said means for measuring said first variable; a second controller operatively connected to said means for measuring said second variable and to said reset means of said first controller; and flow control means in said lift gas inlet means, said flow control means being operatively connected to said first controller.

15. A pneumatic elevating means which comprises a substantially upright gas lift conduit; a solid material engaging chamber surrounding the lower end of said gas lift conduit; a solid material inlet conduit connected to said engaging chamber; lift gas inlet means connected to the lower end of said engaging chamber; a solid material disengaging chamber surrounding the upper end of said gas lift conduit; a solid material outlet conduit connected to said disengaging chamber; gaseous effluent outlet means in the upper portion of said disengaging chamber; means for measuring the pressure drop existing across an upper section of said gas lift conduit; a photoelectric cell positioned in the side of said disengaging chamber; a source of visible light positioned opposite said photoelectric cell in the side of said disengaging chamber; a first controller provided with a reset means, said controller being operatively connected to said means for measuring pressure drop; a second controller operatively connected to said photoelectric cell and to said reset means of said first controller; and flow control means in said lift gas inlet means, said flow control means being operatively connected to said first controller.

16. In pebble heater apparatus comprising a first upright elongated closed shell; pebble inlet means in the upper portion of said first shell; gaseous effluent outlet means in the upper portion of said first shell; gaseous material inlet means in the lower portion of said first shell; a second upright elongated closed shell positioned below said first shell; pebble conduit means connecting the lower end portion of said first shell with the upper end portion of said second shell; gaseous effluent outlet means in the upper portion of said second shell; reactant material inlet means in the lower portion of said second shell; and pebble outlet means in the lower portion of said second shell, an improved pebble elevating means which comprises a substantially upright gas lift conduit; pebble engaging means in the lower end of said gas lift conduit, said engaging means being connected to said pebble outlet means from said second shell; pebble disengaging means in the upper end of said gas lift conduit, said disengaging means being connected to said pebble inlet means to said first shell; lift gas inlet means connected to the lower end of said pebble engaging means; gaseous effluent outlet means in the upper portion of said pebble disengaging means; means for measuring a first variable proportional to the number of pebbles flowing in said gas lift conduit per unit time; means for measuring a second variable proportional to the linear velocity of pebbles leaving the upper end of said gas lift conduit; a first controller provided with a reset means, said controller being operatively connected to said means for measuring said first variable; a second controller operatively connected to said means for measuring said second variable and to said reset means of said first controller; and flow control means in said lift gas inlet means, said flow control means being operatively connected to said first controller.

17. In pebble heater apparatus comprising a first upright elongated closed shell; pebble inlet means in the upper portion of said first shell; gaseous effluent outlet means in the upper portion of said first shell;

gaseous material inlet means in the lower portion of said first shell; a second upright elongated closed shell positioned below said first shell; pebble conduit means connecting the lower end portion of said first shell with the upper end portion of said second shell; gaseous effluent outlet means in the upper portion of said second shell; reactant material inlet means in the lower portion of said second shell; pebble outlet means in the lower portion of said second shell, an improved pebble elevating means which comprises a substantially upright gas lift conduit; a pebble engaging chamber surrounding the lower end of said gas lift conduit, said engaging chamber being connected to said pebble outlet means from said second shell; a pebble disengaging chamber surrounding the upper end of said gas lift conduit, said disengaging chamber being connected to said pebble inlet means to said first shell; lift gas inlet means connected to the lower end of said pebble engaging chamber; gaseous effluent outlet means in the upper portion of said pebble disengaging chamber; means for measuring the pressure drop existing across an upper section of said gas lift conduit; a photoelectric cell positioned in the side of said pebble disengaging chamber; a source of visible light positioned opposite said photoelectric cell in the side of said pebble disengaging chamber; a first controller provided with a reset means, said controller being operatively connected to said means for measuring pressure drop; a second controller operatively connected to said photoelectric cell and to said reset means of said first controller; and flow control means in said lift gas inlet means, said flow control means being operatively connected to said first controller.

18. In pebble heater apparatus comprising a first upright elongated closed shell; pebble inlet means in the upper portion of said first shell; gaseous effluent outlet means in the upper portion of said first shell; gaseous material inlet means in the lower portion of said first shell; a second upright elongated closed shell positioned below said first shell; pebble conduit means connecting the lower end portion of said first shell with the upper end portion of said second shell; gaseous effluent outlet means in the upper portion of said second shell; reactant material inlet means in the lower portion of said second shell; pebble outlet means in the lower portion of said second shell, an improved pebble elevating means which comprises a substantially upright gas lift conduit; a pebble engaging chamber surrounding the lower end of said gas lift conduit, said engaging chamber being connected to said pebble outlet means from said second shell; a pebble disengaging chamber surrounding the upper end of said gas lift conduit, said disengaging chamber being connected to said pebble inlet means to said first shell; lift gas inlet means connected to the lower end of said pebble engaging chamber; means for measuring the pressure drop existing across an upper section of said gas lift conduit; means for measuring the pebble density in an upper portion of said gas lift conduit; a first controller provided with a reset means, said controller being operatively connected to said means for measuring pressure drop; a second controller operatively connected to said means for measuring pebble density and to said reset means of said first controller; and flow control means in said lift gas inlet means, said flow control means being operatively connected to said first controller.

19. In pebble heater apparatus comprising a first upright elongated closed shell; pebble inlet means in the upper portion of said first shell; gaseous effluent outlet means in the upper portion of said first shell; gaseous material inlet means in the lower portion of said first shell; a second upright elongated closed shell positioned below said first shell; pebble conduit means connecting the lower end portion of said first shell with the upper end portion of said second shell; gaseous effluent outlet means in the upper portion of said second shell; reactant material inlet means in the lower portion of said second shell; pebble outlet means in the lower portion of said second shell, an improved pebble elevating means which comprises a substantially upright gas lift conduit; a pebble engaging chamber surrounding the lower end of said gas lift conduit, said engaging chamber being connected to said pebble outlet means from said second shell; a pebble disengaging chamber surrounding the upper end of said gas lift conduit, said disengaging chamber being connected to said pebble inlet means to said first shell; lift gas inlet means connected to the lower end of said pebble engaging chamber; means for measuring pebble density in an upper portion of said gas lift conduit; a photoelectric cell positioned in the side of said pebble disengaging chamber; a source of visible light positioned opposite said photoelectric cell in the side of said pebble disengaging chamber; a first controller provided with a reset means, said controller being operatively connected to said means for measuring pebble density; a second controller operatively connected to said photoelectric cell and to said reset means of said first controller; and flow control means in said lift gas inlet means, said flow control means being operatively connected to said first controller.

References Cited in the file of this patent

UNITED STATES PATENTS

| | | |
|---|---|---|
| 2,279,254 | Irwin | Apr. 7, 1942 |
| 2,424,147 | Campbell | July 15, 1947 |
| 2,554,583 | McFall | May 29, 1951 |
| 2,623,793 | Hill | Dec. 30, 1952 |
| 2,636,642 | Gorin | Apr. 28, 1953 |
| 2,668,365 | Hogin | Feb. 9, 1954 |
| 2,692,225 | Findlay | Oct. 19, 1954 |
| 2,697,640 | Newman | Dec. 21, 1954 |
| 2,727,792 | Bearer | Dec. 20, 1955 |
| 2,746,292 | Vetter | May 22, 1956 |